United States Patent

Cosatto et al.

[11] Patent Number: 5,864,630
[45] Date of Patent: Jan. 26, 1999

[54] MULTI-MODAL METHOD FOR LOCATING OBJECTS IN IMAGES

[75] Inventors: Eric Cosatto, Highlands; Hans Peter Graf, Lincroft, both of N.J.

[73] Assignee: AT&T Corp, Middletown, N.J.

[21] Appl. No.: 752,109

[22] Filed: Nov. 20, 1996

[51] Int. Cl.⁶ ..................................................... G06K 9/00
[52] U.S. Cl. ..................... 382/103; 382/107; 382/118; 382/165; 382/304; 382/203
[58] Field of Search ...................................... 382/103, 107, 382/118, 162, 164, 165, 203, 304; 348/169

[56] References Cited

U.S. PATENT DOCUMENTS

| | | | |
|---|---|---|---|
| 4,972,359 | 11/1990 | Silver et al. | 382/168 |
| 5,243,418 | 9/1993 | Kuno et al. | 382/103 |
| 5,280,530 | 1/1994 | Trew et al. | 382/103 |
| 5,430,809 | 7/1995 | Tomitaka | 382/173 |
| 5,497,430 | 3/1996 | Sadovnik et al. | 382/156 |
| 5,675,663 | 10/1997 | Koerner et al. | 382/118 |
| 5,706,365 | 1/1998 | Rangarajan et al. | 382/230 |

OTHER PUBLICATIONS

Hunke et al. "Face locating and tracking for human–computer interaction" Proceedings of 1994 28th Asilomar Conference on Signals, Systems and computers pp. 1277–1281 vol. 2, Oct. 1994.

Etoh et al. "Segmentation and 2D motion estimation by region fragments" Proceedings Fourth International Conference on Computer Vision pp. 192–199, Apr. 1993.

Schuster "Color objects tracking with adaptive modeling" Proceedings of the workshop on Visual Behaviors pp. 91–96, Jun. 1994.

Primary Examiner—Jon Chang
Assistant Examiner—Jingge Wu

[57] ABSTRACT

A multi-modal method for locating objects in images wherein a tracking analysis is first performed using a plurality of channels which may comprise a shape channel, a color channel, and a motion channel. After a predetermined number of frames, intermediate feature representations are obtained from each channel and evaluated for reliability. Based on the evaluation of each channel, one or more channels are selected for additional tracking. The results of all representations are ultimately integrated into a final tracked output. Additionally, any of the channels may be calibrated using initial results obtained from one or more channels.

27 Claims, 8 Drawing Sheets

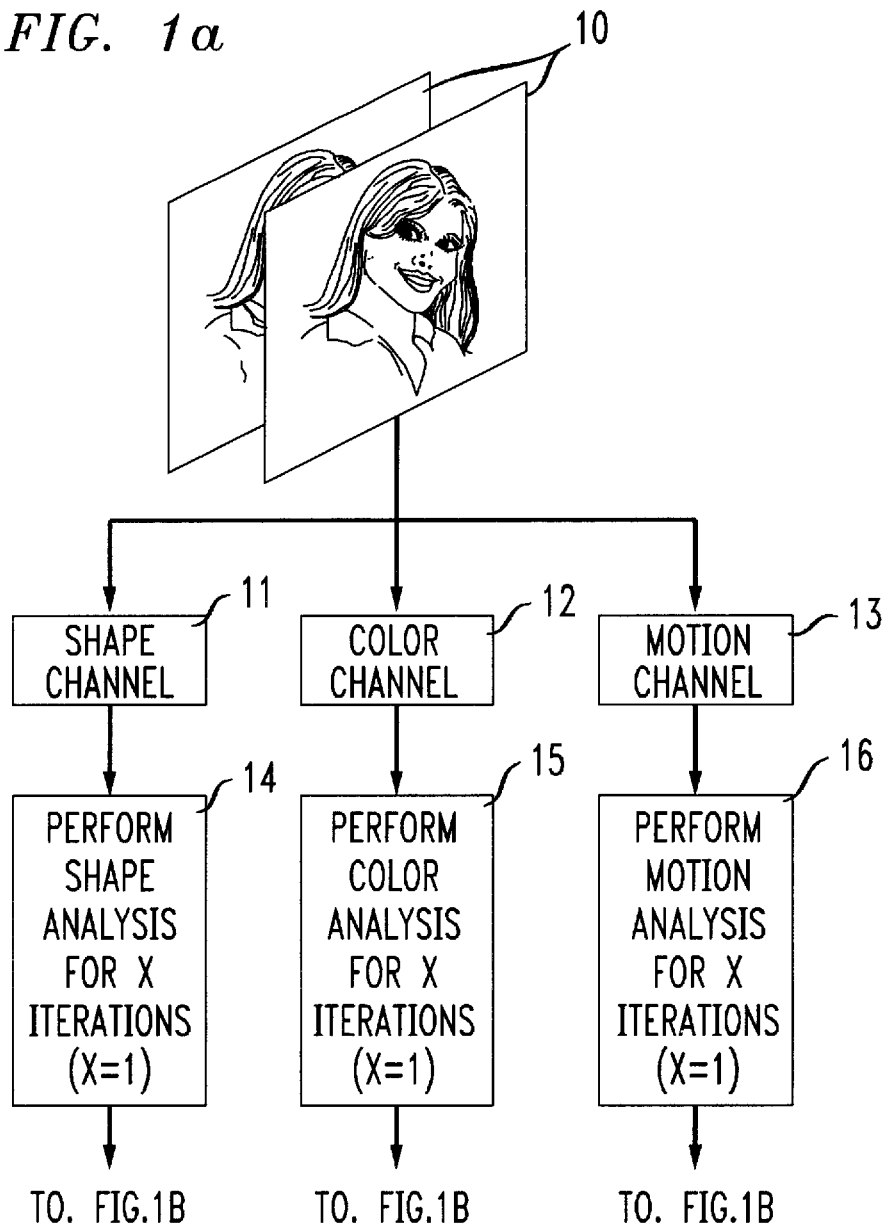

TO FIG.2b

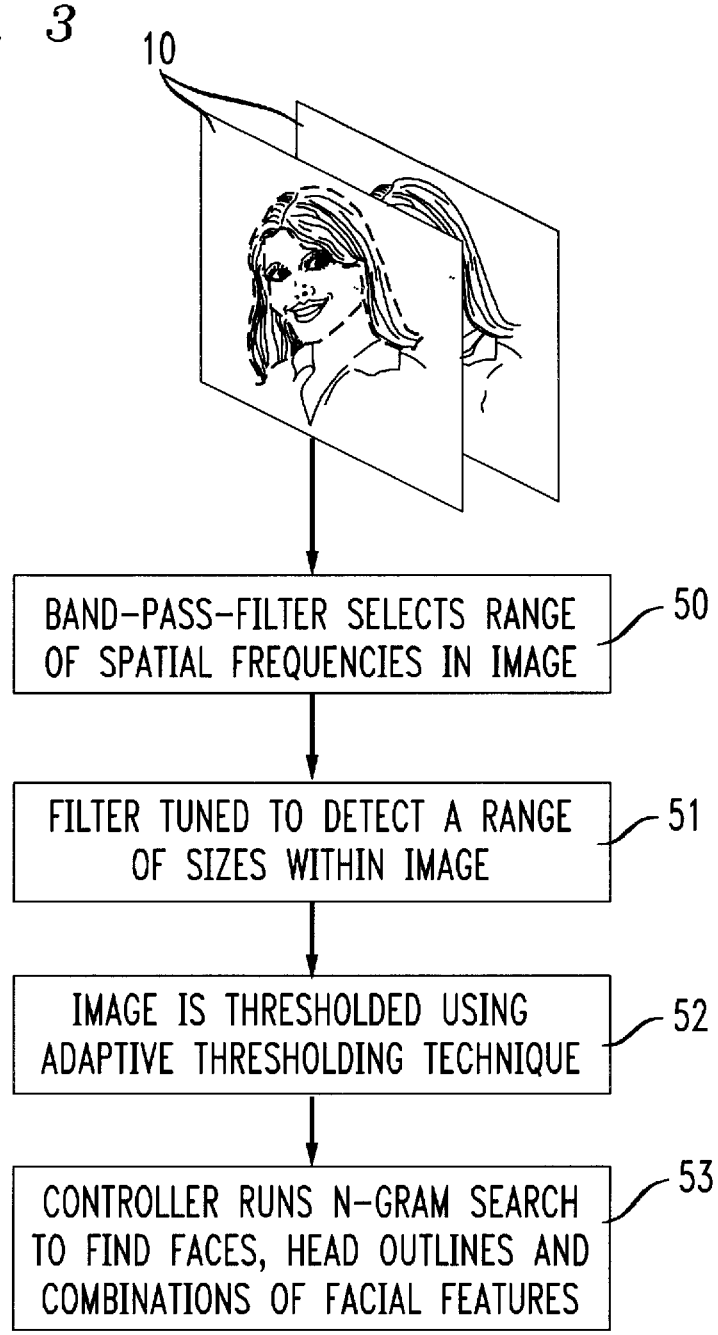

MULTI-MODAL METHOD FOR LOCATING OBJECTS IN IMAGES

BACKGROUND OF THE INVENTION

The present invention relates to methods for identifying objects of varying shapes, sizes and orientations within complex images.

Although the principles of this invention are equally applicable in other contexts, the invention will be fully understood from the following explanation of its use in the context of locating heads and faces within still or moving pictures.

Various applications necessitate the design of a method for locating objects, such as heads and faces, within complex images. These applications include, for example, tracking people for surveillance purposes, model-based image compression for video telephony, intelligent computer-user interfaces, and other operations.

A typical surveillance tracking method may involve the use of a camera installed in a fixed location such as a doorway. The camera conveys its collected images to a modular control system, which locates and identifies heads and facial features of people entering the doorway. Instances of identification may then be communicated to an appropriate source such as an alarm system. Still other applications involve cameras installed on a computer workstation for tracking heads and facial features of persons seated in front of the workstation. Such tracking information may, in turn, be used for workstation access by identifying persons authorized to use the terminal. The foregoing applications are exemplary in nature, as numerous additional applications may be contemplated by those skilled in the art.

Any proposed tracking method should be capable of performing effectively in a practical setting. Tolerance to variations in environmental parameters is highly desirable. For instance, a useful tracking method should function competently over a large range of lighting conditions. A tracking method should likewise be tolerable to variations in camera and lens characteristics and other scene parameters.

Algorithms for identifying faces in images have been proposed in the literature. While these algorithms may suffice for use in environments involving a limited range of conditions, they routinely fail when deployed in a practical setting. Such prior algorithms include simple color segmentation which relies on skin color distinctions to track faces in images. Color segmentation algorithms require analysis of the single parameter of color; they are consequently very fast. Color segmentation provides accurate tracking results where a sufficient contrast exists between skin colors and the background colors of the collected images. Where the skin colors are similar to the background colors, however, these algorithms are typically unreliable.

Most practical applications further require that the tracking method be non-intrusive to the people being observed. For example, a surveillance system at a bank would be unduly intrusive if individuals in the bank were restricted in their movements. A proposed tracking method should therefore permit the free, unobstructed motion of persons under observation. Disadvantageously, simple color segmentation is inadequate where quick or complex movement occurs in the collected images. The color segmentation algorithms often cannot sufficiently evaluate rapidly changing images. Thus, where the persons portrayed are in constant motion, accurate tracking using this method is extremely difficult. The problem escalates where the background colors in subsequent frames become similar to skin colors. In short, using simple color segmentation fails to address the tracking problems encountered in environments having constantly varying parameters such as lighting and motion.

Additionally, simple color segmentation relies on the evaluation of information from a single parameter to produce its results. Because color is the only parameter considered, the tracked results are often imprecise.

Other proposed recognition systems have been described in the literature which use multiple algorithms or classifiers. These classifiers typically rely on additional parameters, such as shape, motion, or other variables, to track the desired objects. Using additional parameters increases the accuracy of the tracked output. In these systems, several different classifiers evaluate an object independently, and then combine the results in a final step. This combinational step may be accomplished, for example, by a voting procedure. Other techniques combine the results of various classifiers using a weighted process that accounts for the error rates of each classifier. Generally, the use of additional parameters enables the tracking system to extract enhanced detail from the collected images. The accuracy of these algorithms and the robustness of the tracked output are therefore improved over that of simple color segmentation.

In addition, combining and integrating the final results provides information to the tracking system which may be used to train the system for subsequent tracking. Such training processes further increase the accuracy of algorithms based on more than one classifier.

One major disadvantage of existing multi-classifier algorithms is their substantially decreased tracking speed. Running a plurality of channels simultaneously requires complex and time-consuming computations. Thus the use of additional classifiers results in a much slower computation time. Moreover, analyses of shape parameters are usually slower than analyses of color parameters for a particular image. These differences in processing speed are attributed to the complexity of shapes within the collected images and the large number of computations required to identify combinations of shapes. For these reasons, speed advantages inherent in simple color segmentation are largely lost for algorithms involving combinations of classifiers.

Another problem with existing algorithms based on multiple classifiers is that each classifier typically operates independently of the others. No intermediate steps exist for comparing classifier results. The results are combined only as part of a final step in the process. As such, no single classifier may confirm the accuracy of its data, or compare its data with that of other channels, until the end of the analysis. This problem derives from the inherent characteristics of existing recognition systems. No relationship exists between the data gathered by one classifier and the data gathered by another. For example, one channel in the system may analyze and collect data based on the positioning of pixels on a screen, while another channel may generate tables of data based on an unrelated statistical extraction program. Results between such channels cannot be meaningfully compared until the end of the analysis, where complex algorithms are employed to combine and integrate the final data.

The problem is exacerbated where a channel has gathered inaccurate information for a large number of iterations. In such a case, the final result may be imprecise. Further, because the classifiers track their respective parameters independently, no ability exists for one classifier to calibrate another classifier before the latter initiates its analysis. These disadvantages result in more complicated algorithms and greater computation times.

The following needs persist in the art with respect to the development of algorithms for tracking objects in collected images: (1) the need for a tracking method which provides a more robust and accurate output; (2) the need for a tracking method which is considerably faster than existing algorithms based on multiple classifiers; (3) the need for an efficient tracking method based on multiple channels to enhance the accuracy of the output; (4) the need for a multi-channel tracking method where the accuracy of each channel is confirmed by results obtained from other channels; and (5) the need for a tracking method capable of simultaneously maximizing tracking speed and output precision.

It is therefore an object of the present invention to provide a tracking method which provides a more accurate and robust tracked output than existing algorithms.

Another object of the invention is to establish a tracking method which is faster than existing multi-classifier systems, and which achieves a maximum level of accuracy of the tracked result.

Another object of the invention is to provide a more efficient tracking method.

Another object of the invention is to set forth a multi-channel tracking method having the ability to confirm the accuracy of each channel's output by comparing results from other channels at various stages during the tracking process.

Another object of the invention is to provide a tracking method which produces an intermediate image for early evaluation and for optimal subsequent channel selection by the system.

Additional objects of the invention will be contemplated by those skilled in the art after perusal of the instant specification, claims, and drawings.

SUMMARY OF THE INVENTION

These objects of the invention are accomplished in accordance with the principles of the invention by providing methods which track objects such as heads and faces within complex images. The methods comprise a multi-channel tracking algorithm which intermediately measures the quality of its channels' outputs, and thereby determines an optimal tracking strategy to be used for the remainder of the algorithm. The methods provide for a substantial improvement in speed and accuracy over prior tracking systems.

The methods comprise the use of a combination of shape analysis, color segmentation, and motion information for reliably locating heads and faces in fixed or moving images. The methods further comprise the generation of an intermediate representation for each channel wherein tracked results are evaluated and compared by a system controller. Based on these results, the controller can make the decision as to which channels should remain active for the duration of the tracking process. This selection is made for achieving optimal tracking speed and output accuracy.

The methods use three channels for tracking three separate parameters. A first channel performs a shape analysis on gray-level images to determine the location of individual facial features as well as the outlines of heads. A second channel performs a color analysis using a clustering algorithm to determine areas of skin colors. The color channel may, but need not, be calibrated prior to activation by using results obtained from one or more separate channels. A third channel performs a motion analysis wherein motion information is extracted from frame differences. The motion analysis determines head outlines by analyzing the shapes of areas having large motion vectors.

In a preferred embodiment, the tracking analysis begins with an evaluation by all three channels. After one or more iterations, an intermediate representation of the collected tracking output is obtained from each. The intermediate representations comprise shapes where facial features or the outlines of heads may be present.

All three channels ideally produce identical representations of tracked head and facial positions. Hence, the information from each channel may be seamlessly integrated into a single result. Meaningful comparisons between the channel data may also be performed. In particular, a system classifier evaluates the quality of each channel's generated head and facial features. In a preferred embodiment, the evaluation is performed using an n-gram search. Based on this evaluation, the controller determines the optimal strategy for performing the remainder of the tracking analysis. This evaluation is advantageously performed at a very early stage in the algorithm. The final tracked output is therefore achieved much faster than as compared with previous algorithms.

The controller of the tracking system may be implemented in either hardware or software. The controller may, for instance, be a state machine designed to achieve a precise final result for the location of heads and faces. After obtaining intermediate representations from the channels and running an n-gram search, the controller selects an appropriate combination of channels for continued analyses. The shape, motion, or color channel, or any combination thereof, may be activated for a selected number of frames until the tracking process is completed. For example, the very fast color channel is often sufficiently reliable to run by itself for several frames.

By choosing one or two channels to run for part of the tracking process while keeping the remaining channel(s) inactive, the computation time is kept low. By the same token, the existence of three channels producing identical representations for eventual integration into the final tracked output provides for a high degree of accuracy and robustness.

In addition, the controller may reassess the tracked results at various stages after making the intermediate channel selection described above. It makes this reassessment by reinvoking additional channels for a selected number of frames, and then running an n-gram search as to the collective results. To sustain optimal tracking performance, the controller may choose to further invoke or deactivate channels until the completion of the analysis.

The system classifier integrates all collective representations using n-gram searches to form the tracked output. These searches may take place at the intermediate stage or any time thereafter as determined by the controller. The controller also invokes an n-gram search after activity on the channels concludes. These searches produce a list of likely head positions and the locations of facial features. The result is a tracking algorithm which balances the variables of speed and accuracy based on simple channel comparison.

In another preferred embodiment, the tracking method begins with a shape and motion analysis. After one or more iterations, the collected information is used to calibrate the color channel. Such calibration is particularly desirable where skin colors are difficult to distinguish from background colors. Following calibration, the tracking process may proceed pursuant to any method described herein. Using this process, accurate intermediate representations from the color channels can be obtained at a much earlier stage than if calibration were unavailable.

From the above methods of evaluating intermediate channel results to select the use of subsequent channels, numerous embodiments and variations may be contemplated. These embodiments and variations remain within the spirit and scope of the invention. Still further features of the invention and various advantages will be more apparent from the accompanying drawings and the following detailed description of the preferred embodiments.

BRIEF DESCRIPTION OF THE DRAWINGS

FIG. 3 is a flow chart representing a method for performing a shape analysis in accordance with one embodiment of the present invention.

DESCRIPTION OF THE PREFERRED EMBODIMENTS

Figure 1B:
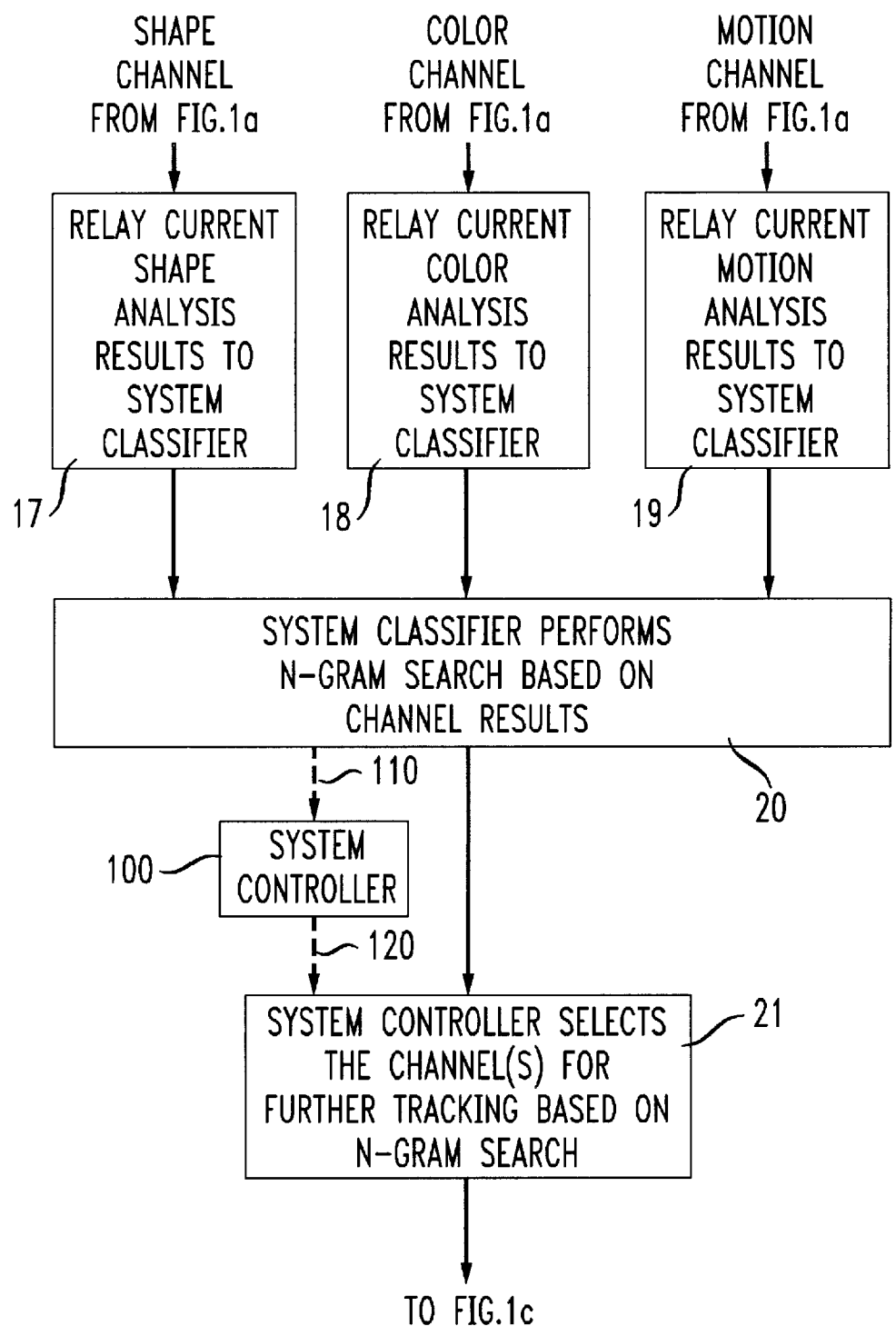
FIG. 1, also known as FIGS. 1a, 1b, 1c, and 1d, and 1e, depict a flow chart of an exemplary tracking algorithm in accordance with one embodiment of the present invention.

Referring now to FIG. 1, which depicts an algorithm in accordance with one embodiment of the present invention, images 10 are selected for tracking. It will be evident that certain steps within FIG. 1 are exemplary in nature and optional to the algorithm's implementation. The tracked objects in FIG. 1a comprise heads and facial features. The images 10 selected for tracking may comprise a single frame or a sequence of frames, and may originate from any of an unlimited number of sources. The frames may, for example, derive from a camera set up in a room. The images need not be created in a controlled environment. Images instead may be extracted from outdoors, from a dimly lit room, from an area having moving objects, or from another location. In this preferred embodiment, the algorithm is initiated by the activation of all three channels: the shape channel 11, the color channel 12, and the motion channel 13. Channels 11, 12, and 13 may be operated or invoked by a system controller or other appropriate hardware device. The channels may also be controlled by a software program.

The channels 11, 12, and 13 begin their respective analyses of shape, color and motion. The color channel 12 is provided with generic calibration parameters. These parameters may be supplied by the system controller or another source. If sufficient differences exist between the skin colors and the background colors of the images to be tracked, generic calibration parameters ordinarily suffice for the analysis.

As indicated by the steps 14, 15, and 16 in FIG. 1a, each channel 11, 12, and 13 performs its analysis for a predetermined number of iterations or frames x. Following the analyses, the channels relay their respective tracking data to a system classifier or other device (steps 17, 18, and 19, FIG. 1b). A system classifier can be broadly defined as a system or software program for analyzing data obtained from the channels. There are many types of classifiers. Typical examples are neural network classifiers and statistical classifiers. A preferred embodiment of the invention uses an n-gram classifier, as will be explained in detail below.

The data produced by each channel comprise a list of areas which may contain head outlines and facial features. Thus, each channel generates an intermediate feature representation (not shown in the figures).

The channels' intermediate representations comprise information relating to the same tracked features, even though each channel uses a different parameter (color, motion, and shape) to obtain these features. For at least two reasons, the identical nature of the channels is highly advantageous. First, the channels' results may be evaluated without the need for complex, time-consuming transformations. Second, each channel's intermediate representation is amenable to meaningful integration into a single list of likely head and facial positions.

The feature representations of the channels may be capable of visual display on a screen, but more typically they are internal data structures compatible for prompt interpretation by the system classifier. These data structures mark areas perceived by the channels as comprising head outlines or facial features.

As indicated by the succeeding step 20 in FIG. 1b, the system classifier compares, evaluates and integrates the generated features. A preferred method for performing these functions is to use an n-gram search. Preferably, an n-gram search is performed after the passage of each frame wherein one or more channels are active. An n-gram search uses information obtained from all three channels to evaluate the quality of individual features, as well as combinations of features, within the representations. Using this search, the system classifier assigns a measure of confidence for each feature and each combination of features. Based on these measures of confidences produced by the system classifier using the n-gram search, the system controller determines which channel(s) should be used for further tracking to arrive at the final result.

As an illustration, the system classifier performs an initial n-gram search after it obtains the three channels' intermediate feature representations. Candidate facial features in the representations are marked with blobs of connected pixels. The classifier analyzes the shape of each individual feature, and discards those that definitely cannot represent a facial feature. This stage of the search is the uni-gram search. Exemplary facial features which may be considered at the uni-gram stage are the eyes, eye brows, nostrils, mouth, chin groves, the left outline of a head, etc. The classifier associates a measure of confidence for each such feature based on its perceived level of accuracy. Next, the classifier evaluates and classifies combinations of two features in a bi-gram search. At this stage, the classifier considers whether connected components can represent a combination of two facial features, such as an eye pair, eye brows, an eye and a mouth, the left and right outlines of a head, etc. Based on this evaluation, the system classifier assigns a measure of confidence for each such combination. In the next stage, the classifier evaluates triple combinations of features in a tri-gram search, and likewise assigns measures of confidence for these combinations. Each stage of the search establishes information as to the reliability of the channels.

A tri-gram search may establish, for example, that perceived areas of skin colors reported by the color channel are accurate because the reported area falls within the perceived left and right head outlines obtained from the motion channel. Thus, the classifier would likely assign a high measure of confidence to the triple combination of left head outline, right head outline, and skin areas. From this and other information, the classifier may deduce that the color and motion channels are producing reliable information. Thus a high score may be given to the color and motion channels, as described below. In other situations, the color channel may be inaccurate. For instance, the perceived areas of skin colors reported from the color channel may not fall within head outlines reported from the motion channel. By the same token, the perceived mouth area reported by the shape channel may be accurately positioned within the head outlines. Based on this information, the classifier would likely assign a low measure of confidence for the skin color area, but a high measure of confidence to the triple combination of head outlines and the mouth area. These results potentially reflect a low reliability for the color channel 12, and higher reliabilities for the shape 11 and motion 13 channels.

The n-gram search may continue until sufficient data is obtained for the system controller: (1) to calculate, based on the obtained measures of confidence, which channel(s) is/are best suited for further tracking; and (2) to integrate, using the classifier or other dedicated program, the individual feature representations into a net representation for maintaining the tracked results. Feature representations obtained from future tracking steps are later integrated into the final output using one or more additional n-gram searches following each frame.

One goal of the invention is to arrive at the intermediate representation stage as quickly as possible. The earlier the generation of the feature representations, the faster the performance of a channel, and the faster the selection of channel(s) for additional tracking. In this manner, information relating to the tracked objects will be made available to the controller at a very early stage in the process. The total tracking time is consequently decreased. With the present invention, the results from channels 11, 12, and 13 are relayed to the system controller after a single iteration (i.e., x=1). Thus the system obtains channel evaluation at a very early stage in the analysis.

The interaction between the system classifier and the system controller is illustrated in FIG. 1b by the box 100 and the two dashed lines 110 and 120. The results of the n-gram search are made available to the system controller 100, as represented by the dashed line 110. These results are used as part of the selection step 21 described below. The use of the results for channel selection is represented by the dashed line 120 and step 21.

In the next step 21 depicted in FIG. 1b, the system controller determines which channels to select for further tracking. The selection is made based on the results of the n-gram search described above. In a preferred embodiment, the controller determines a general score Y1, Y2, and Y3 for each channel 11, 12, and 13. The determination of a general score facilitates the selection process. A variety of suitable means exist for determining the channels' general scores. Preferably, the system controller computes these general scores from the measures of confidence determined by the system classifier for individual features and combinations in the n-gram search. The controller then selects additional channel(s) to be used based on the channels' general scores. In making its channel selection based on general scores, the controller may select the channel(s) with the highest score (s). Alternatively, the controller may take additional variables into account, such as the relative speeds of the individual channels, before making its selection.

In addition, a fixed threshold measure of confidence may optionally be identified with each channel. This fixed quantity may, for example, represent the lowest permissible score for a channel. The quantity may vary depending on the terms of the algorithm or the nature of the images to be tracked, or other factors.

As an illustration, if the shape channel 11 has a subthreshold general score, continued use of that channel may produce unreliable results. Thus the analysis may continue using only color 12 or motion 13 analysis, or both. As another example, if the shape 11 and motion 13 channels' confidence measures exceed their respective threshold values, the system controller may decide to run only the shape analysis for a designated number of frames. Whatever channel is ultimately chosen, the tracking process is much faster because only one or two parameters are measured for several frames. This method is therefore superior to methods involving the full and continuous use of all three channels.

Depending on the confidence measure of each feature, the size of the microprocessor in the system controller, the complexity of the images to be tracked, and other factors, numerous approaches to the algorithm will be contemplated. Such variations are intended to fall within the scope of the invention.

Figure 1C:
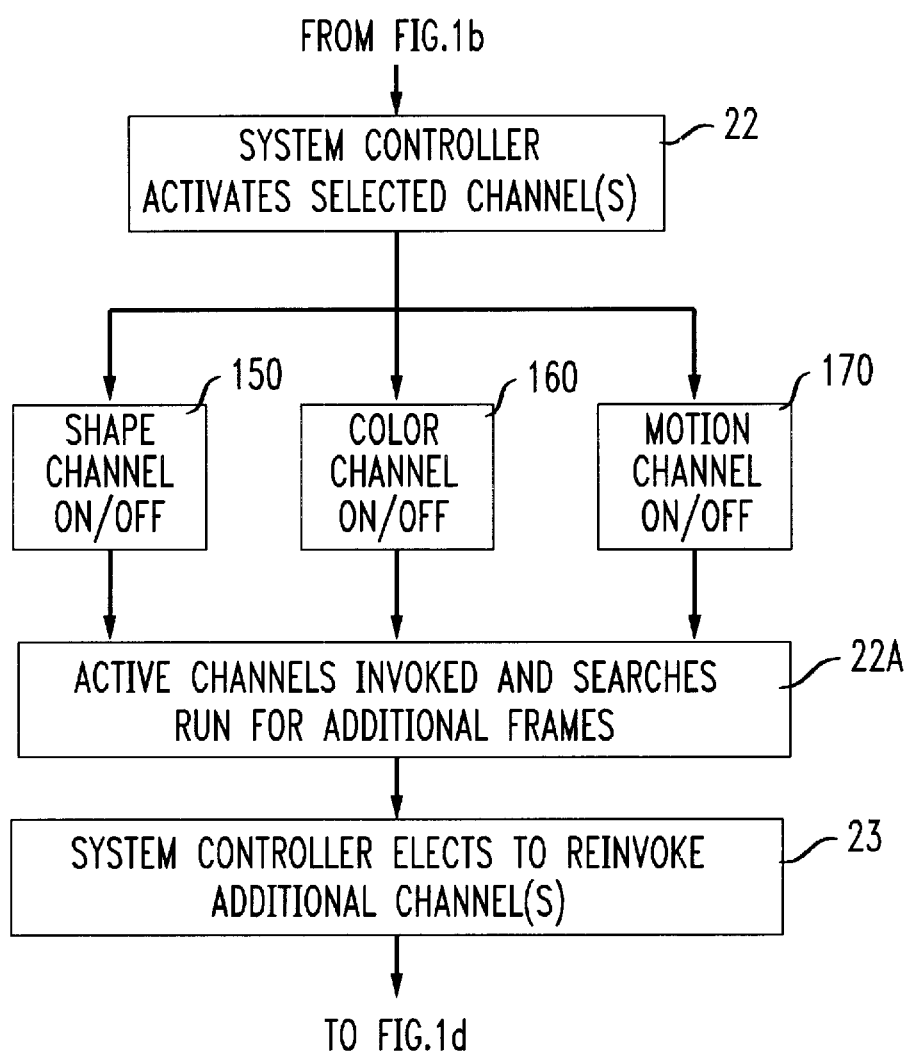
Figure 1D:
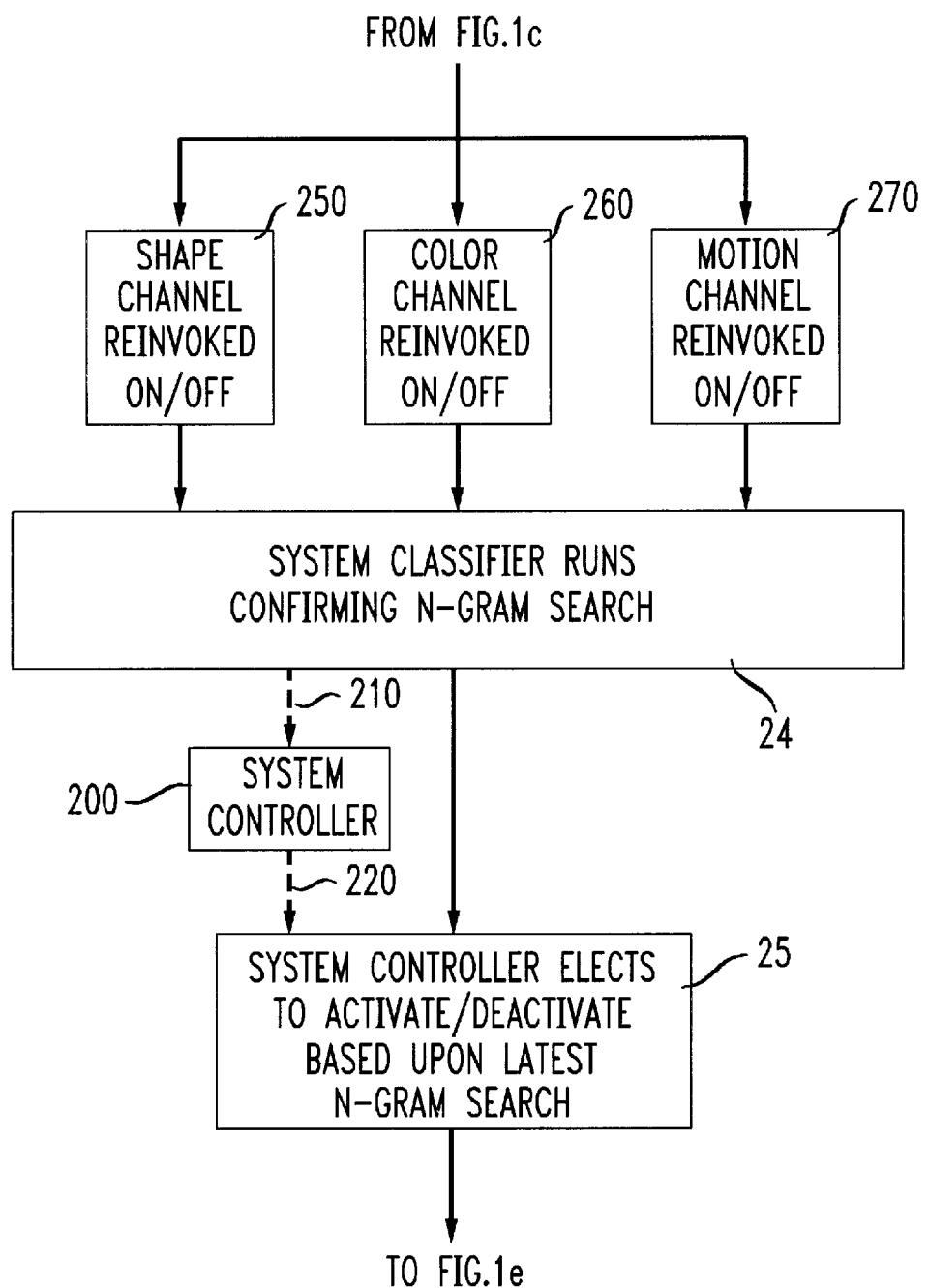

In the next step 22 in FIG. 1c, the controller implements the channel or combination of channels to be run for a selected number of frames. For example, often the color analysis is perceived to be reliable based on the n-gram search results. Running the very fast color analysis alone for several frames advantageously increases tracking speed. Thus, if the color channel has a high enough general score Y2, the system controller may select the color channel 12 to run for a predetermined number of frames.

In other situations, the color channel 12 will have a low general score Y2. In that case, the controller may instead activate the shape 11 or motion 13 channels, or both, for a predetermined number of frames. The controller will therefore select a tracking strategy which minimizes the effect of the color channel 12 on the final output.

The particular channel selection, of course, will vary depending on the search results. The state of each channel (on or off) following channel activation is illustrated by boxes 150, 160 and 170.

Following this sequence of steps representing the initial channel selection by the system, the active channels continue to extract information in subsequent frames using the above described methods. Preferably, the classifier runs its analysis after each frame as the tracking algorithm proceeds. Thus one or more additional frames, together with a corresponding classifier analysis of each frame, are generally represented by box 22a. The passage of frames represented by box 22a may continue for a predetermined time or until the system controller prompts a change in the tracking procedure. A change may occur, for example, where the system controller deactivates activity on the channels. A change may also occur where the system controller elects to reinvoke additional channels or deactivate selected channels as described below.

Figure 1E:
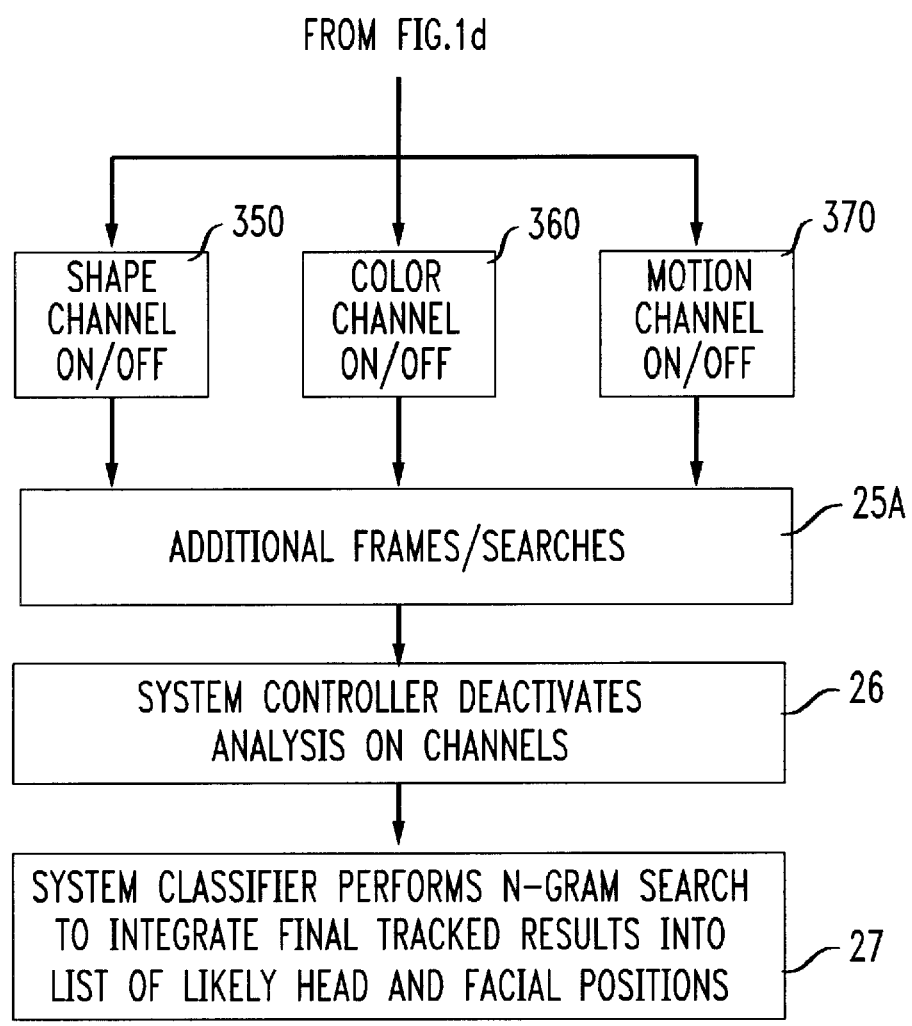

The system controller may decide to reactivate one or more channels at a later point in the tracking process, as illustrated by step 23 in FIG. 1c. The controller may reinvoke channels for numerous reasons. For instance, the controller may elect to reconfirm results currently being obtained based on a previous channel selection. Reconfirmation is useful, among other situations, where an activated channel's general score Y was previously computed at a borderline value. Additionally, the controller may opt to reattempt use of the very fast color channel 12, which was previously rejected as unreliable by an earlier n-gram search. The status of the channels after the reinvocation of additional channels (step 23) is represented by boxes 250, 260, and 270. After the newly reinvoked channel has run for a frame, the controller invokes the classifier as usual to perform an n-gram search to evaluate the newest results (step 24, FIG. 1d). Based on these search results, the controller may activate or deactivate one or more selected channels to maintain tracking speed and accuracy (step 25, FIG. 1d). The interface between the controller and the classifier is represented by box 200 and corresponding dashed lines 210 and 220. The interface is analogous to the controller interface of FIG. 1b. In FIG. 1e, boxes 350, 360 and 370 represent the current state of the channels (i.e., on or off) following the activation step 25.

The following example illustrates the subsequent use of channels for reconfirmation. The controller determines in step 23 that the color channel 12 is best suited for further tracking. The color channel 12 is therefore invoked for several additional frames x1. No shape and motion computations are required during this time. In a preferred embodiment, x1=10, but in practice the quantity x1 can cover a wide range and still facilitate effective tracking. After the passage of x1 frames, the controller activates the motion channel 13 for a selected number of frames x2. The motion channel 13 and the color channel 12 run concurrently for x2 frames. The quantity x2 is selected by the controller. Preferably, x2<10. After the passage of each frame during the x2 frames, the controller compares the results of the motion channel 13 and the color channel 11 as previously described. If the color channel 11 receives a high general score Y2 for each frame based on high feature-based measures of confidence, the accuracy of the color channel is confirmed. In this event, the controller may either conclude the analysis or track for additional frames using only the color channel 12. Conversely, if the n-gram searches reveal that the color channel had lost its accuracy, the controller may select another combination of channels to run for the remainder of the algorithm.

In the example above, the color channel runs for a total of x+x1+x2 iterations, the shape channel runs for x+x2 iterations, and the motion channel runs for x iterations where x=1 (typically), and x2 is typically less than 10. During the majority of this process, only the very fast color segmentation process need be calculated (plus reduced analyses of the shape and/or motion channels 11 and 13). This method saves considerable computation time as compared with previous processes that run a full analysis of all three channels. Moreover, this method achieves a high accuracy due to the availability of multiple tracking parameters.

The controller may alternatively determine that the shape channel 11 is best suited for further tracking (step 21, FIG. 1b). The controller may also reinvoke the color channel 12 at a subsequent time in the analysis. If a higher general score Y2 for the color channel is later obtained, the results of the color channel may then be integrated into the final tracked output. The controller may also implement a calibration procedure for the color channel 12, and then reinvoke use of that channel.

Additional frames may pass, with corresponding searches run after each frame, using the activated/deactivated channels from step 25. This sequence of frames is generally represented by box 25a. Also, during the course of the algorithm, additional channel confirmation/activation steps may be performed (e.g., steps 23–25) depending on the quality of the obtained representations, or at the instigation of the controller, etc.

The system controller concludes the tracking analyses by deactivating all active channels (step 26, FIG. 1e). The channel-based tracking analysis is now complete. Together with information already obtained from previous frames, the system classifier evaluates and integrates the final data (step 27, FIG. 1e). An n-gram search is preferably used to integrate the final output data. Using the n-gram method, features and combinations of features are again evaluated and classified, and the controller selects lists of perceived areas based on these classifications. In the end, the tracked output comprises a list of likely head and facial positions within the tracked images.

In sum, depending on the reliability of the channels as determined by the n-gram searches, the controller selects among a plurality of appropriate tracking strategies. The controller generally elects the strategy which maximizes both the speed and accuracy of the system. To maximize speed and accuracy, the system controller selects only the most reliable channel(s) to perform the majority of the tracking. The controller makes this selection by evaluating reliability data produced by the classifier.

Figure 2A:
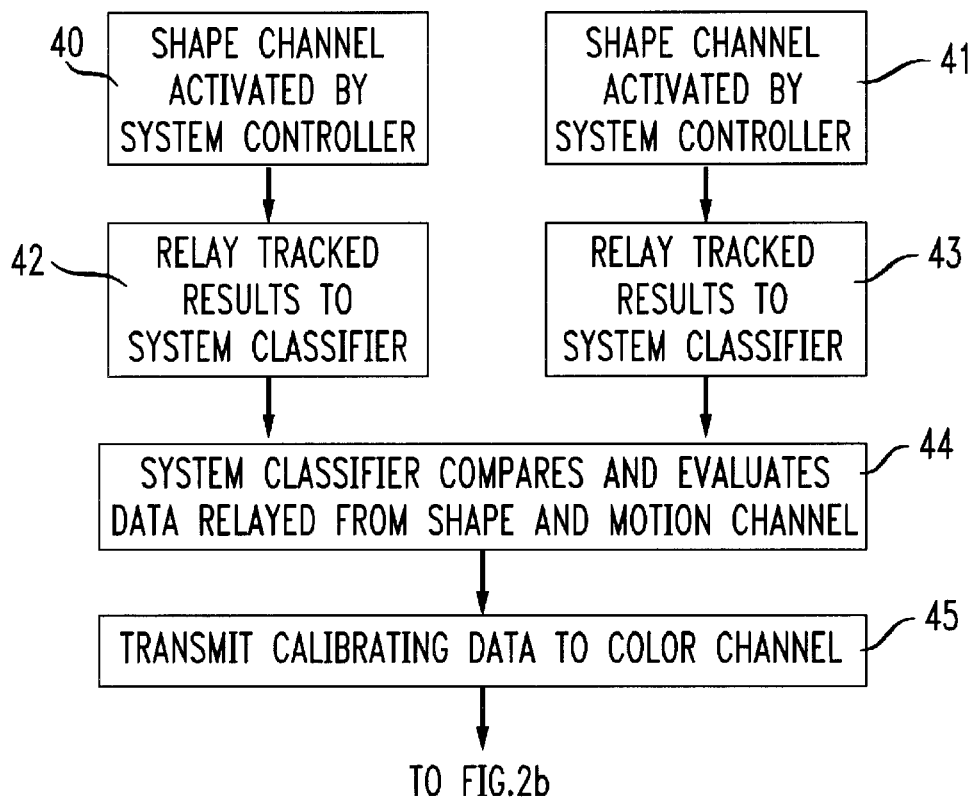
FIGS. 2a and 2b depict a flow chart representing the calibration of the color channel in accordance with one embodiment of the present invention.
Figure 2B:
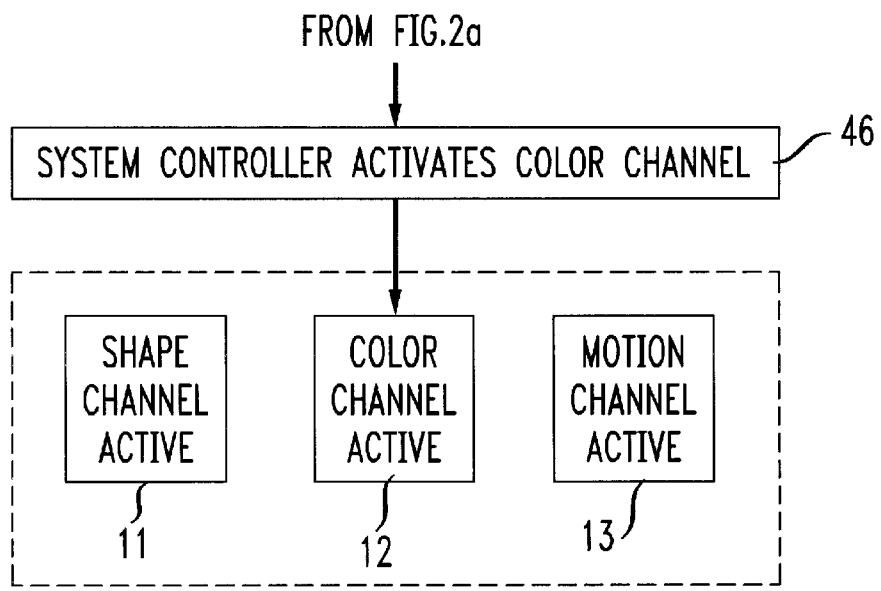

Another preferred embodiment is depicted in FIGS. 2a and 2b. Here, the color channel is calibrated prior to activation. Calibration is particularly desirable where the background colors on the images to be tracked are akin to the facial colors. Proper calibration enables the color channel 11 to summarily reject background and extraneous colors on the tracked images. A faster, more precise color analysis is therefore achievable.

To accomplish calibration, the system controller first activates the shape 11 and motion 13 channels (steps 40, 41, FIG. 2a). These channels perform their usual analyses. After some predetermined number of iterations (often a single iteration), the shape channel and motion channels 11 and 13 relay their current results to the system classifier (steps 42 and 43). In the next step 44, the system classifier compares and evaluates the relayed data. This data may now be used to calibrate the color channel 11. Advantageously, the evaluation step 44 comprises a straightforward processing of data since the shape 11 and motion 13 channels use identical output formats as previously discussed.

Next, in step 45, the newly-formulated calibration parameters are transmitted to the color channel 12. In the next step 46 (FIG. 2b), the controller activates the color channel 12. All three channels are now performing their respective tracking analyses. The remaining steps of the process may proceed pursuant to any of the other embodiments, such as steps 14, 15 and 16 in FIG. 1a.

As an alternative to the above embodiment, the system controller may deactivate the shape 11 or motion 13 channels, or both, after calibrating the color channel 12. While calibration preferably occurs at the beginning of the analysis, it may occur at subsequent stages. Calibration may also be accomplished using a single channel such as the shape channel 11.

Calibration enables the very fast color channel 12 to produce a more reliable output. Having calibrating data to pinpoint perceived locations of heads and facial features, the color channel 12 can complete its tracking analysis more quickly and accurately. As such, the entire tracking algorithm is faster. Where background colors are dissimilar to skin colors, the calibrating step need not necessarily be performed.

The system controller may choose to activate the fast color analysis alone for the majority of the tracking process. As such, the total tracking speed is further increased. In addition, the controller may subsequently invoke one of the other two channels 11 and 13 to confirm results obtained from the color channel 12. Accuracy is thereby achieved without the need for time-consuming computations like in prior art algorithms.

The preferred modes of operation for the particular channels will now be discussed.

Shape Analysis

It will be understood that the shape analysis may be implemented using a variety of appropriate methods. The method presently preferred by the inventors is set forth below.

The shape analysis seeks to find outlines of heads or combinations of facial features which indicate the presence of a face. Preferably, the shape analysis uses luminance only. As such, the analysis is effective even where cheap monochrome cameras are used.

For frontal views of faces, the algorithm first identifies candidate areas for facial features. The algorithm next searches for combinations of such features to find the whole faces. In images with a low resolution, individual facial features may not be distinguishable. A person may also turn away from the camera so that only the back of the head is visible. In such cases the algorithm seeks to find the outline of the head.

A key element of the shape analysis is to obtain an intermediate representation of the tracked results. From this representation, facial parts or head outlines can be tracked using straightforward computations. FIG. 3 depicts a preferred shape algorithm. An image 10 is transformed by two filters in steps 50 and 51. The first is a band-pass filter. Facial features exhibit intensity variations; hence their appearance can be emphasized by selecting a band of spatial frequencies. The band-pass filter is therefore comprised of a range of cutoff frequencies whereby only images having the desired range of spatial frequencies are accepted.

After the band-pass filtering step 50, the image passes through a second filter which is tuned to detect a range of sizes of simple shape. This filtering is accomplished in step 51. The second filter convolves the image with a shape such as a rectangle or an ellipse. Using this filtering method, areas of high intensity that are larger than the structuring kernel are emphasized, while smaller areas are reduced in intensity. Steps 50 and 51 reduce variations in the tracked images due to changing lighting conditions, and enhance areas of facial features and head boundaries.

After the filtering operations 50 and 51, the image is thresholded with an adaptive thresholding technique 52. The purpose of this technique is to identify the positions of individual facial features by using a simple connected component analysis. If the threshold level is selected properly, the areas of prominent facial features will become visible. In particular, areas such as eyes, mouth, eye brows, and the lower end of the nose are marked with blobs of connected pixels which are well separated from the remainder of the image. The algorithm can then locate the position of a face by searching for appropriate combinations of these blobs. The images are treated similarly for finding the outline of a head. For the head, however, both vertically and horizontally extended regions of high spatial frequencies are filtered out by the band-pass filter.

Once candidate facial features are marked with connected components as described above, combinations of such features which represent a face are next sought. This step 53 is preferably accomplished using the aforedescribed n-gram method. The method discards connected components which cannot comprise facial features, and assigns a measure of accuracy to the remainder.

At each stage of the search, the connected components are evaluated with small classifiers that utilize inputs such as component size, ratios of distances between components, and component orientation.

The search for the head outline proceeds in a similar manner. The first search scan selects those connected components that can represent left or right boundaries of a head. Next, the system classifier examines combinations of left and right edges. Finally, combinations of vertical and horizontal edges are evaluated. The head outline is approximated with an ellipse, and the coverage of an ellipse by connected components is taken as a measure of the quality of the fit. In addition, if results from the other two channels are available, they may be included in the n-gram search.

The computation of the n-gram search increases exponentially with n, the number of different components taken into account. Thus, the search is potentially costly and time-consuming. However, by using the hierarchical search algorithm described above and by eliminating components with low measures of quality from consideration, the computation can be kept very fast. In fact, the computation for the whole shape analysis is dominated by the time for the band-pass filtering step 50 and the shape filtering step 51. A typical search time for the shape analysis, using a 150 MHZ pentium microprocessor to track an image with a size of 360×240 pixels, is less than 0.5 seconds.

Certain parameters are required to implement the shape analysis. These include the cut-off frequencies of the band pass filter, the size of the structuring kernels for the shape filtering, and the thresholds for binarizing the results. These parameters may be determined using a method such as a fully automatic training procedure. In a preferred method, one-hundred images of twenty-five people are used to establish measurements for input into the tracking system. In the training procedure, the positions of the eyes, the left and right end points of the mouth, and the lower end of the nose can be measured by hand. Next, the sizes of the connected components representing facial features are measured. For an automatic optimization of the parameters, a quality measure of the following form is useful:

$$S=100-(a*(x-x(0)))-(b*(w-w(0)))$$

where

S=quality of the marking of the feature x=position of the connected component x(0)=desired position of the connected component w=width of the connected component w(0)=desired width of the connected component a, b=scaling factors Thus, an independent optimization of each parameter may be performed by scanning one parameter over its whole range of values while keeping the other parameters constant.

When tracking parameters are properly chosen, the facial features may be accurately tracked over a wide range of scales and conditions. For instance, eye regions may be found regardless of whether the eyes are open or closed. The same is true for mouths. Whether the mouth is open or closed has little influence on the ability of the described technique to mark the correct area on the image.

Advantageously, this approach enables the system to track a wide range of sizes of facial feature using a single set of parameters. Other existing approaches are inferior. For example, existing methods which use filters designed for detecting whole heads or faces tend to be very scale sensitive. Thus, for those methods, many search scans need be performed to permit the tracking of faces covering a range of sizes. The shape-tracking technique of the present invention, however, can handle a range of head sizes of more than a factor of two. As an additional benefit, the invention accommodates such variances using a single set of parameters.

Color Analysis

Figure 4:
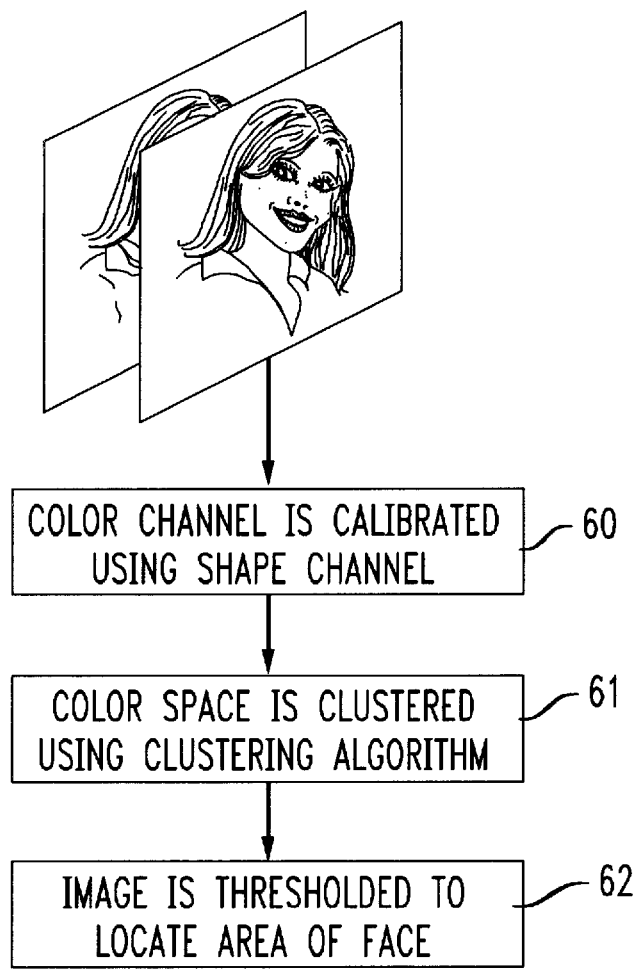
FIG. 4 is a flow chart representing a method for performing a color analysis in accordance with one embodiment of the present invention.

FIG. 4 depicts a color algorithm in accordance with the present invention. The following algorithm comprises a preferred method of performing a search based on color; however, other suitable methods may be contemplated. Color information is an efficient vehicle for identifying facial areas and specific facial features. However, the system must often be calibrated to accommodate specific conditions. Unfortunately, these calibrations usually cannot be transferred to different cameras and to strongly varying conditions in the illumination. Skin colors can vary considerably. In addition, skin colors are often indistinguishable from similar background colors. For this reason, color analysis in the present invention is used only in combination with shape and motion analyses. Particularly where colors are difficult to distinguish, the color channel should be calibrated first.

After a calibration step 60 the color space is clustered with a leading clustering algorithm for finding a whole space, as in step 61. In this algorithm, one or two cluster centers are initialized to skin colors of a part of the face identified by the shape analysis. Normalized rgb values are chosen as color space:

r=R/(R+G+B)
g=G/(R+G+B)
b=B/(R+G+B)

Using normalized rgb values advantageously minimizes the algorithm's dependence on luminance. Dark pixels (R+G+B<30) are set to zero to avoid instabilities caused by the normalization process.

After skin colors have been identified with the calibration and the clustering process, the image is next thresholded in order to locate the area of the face (step 62).

When whole faces alone are to be tracked, color information is used only to identify larger areas. In such a case, the tracked image is typically subsampled to 40×30 pixels using bilinear interpolation. After binarization, each segment in the image is analyzed for its shape and size to determine whether or not it can represent a face. Faces are often the dominating set of connected components in the image, and thus the face position can be easily identified. Using a 90 MHZ pentium microprocessor, the typical time required for the color analysis following calibration is 10 milliseconds.

Motion Analysis

If multiple images of a video sequence are available, motion is often a parameter that is easily extracted. This parameter provides a quick method to locate an object such as a head. The first step in a preferred motion algorithm is to compute the absolute value of the differences in a neighborhood surrounding each pixel within the image to be tracked. A typical neighborhood is 8×8 pixels. When the accumulated difference for a pixel is greater than a predetermined threshold T, the system controller then classifies that pixel as belonging to a moving object. T is typically set at 1.5 times the temporal noise standard deviation, times the number of pixels in the neighborhood.

Applying the threshold to the accumulated difference as opposed to the individual pixel difference results in two advantages. First, T can be expressed with increased precision. Second, the neighborhood processing has an effect similar to morphological dilation. This helps fill small gaps that occur in areas where the moving object has similar pixel values to the background. The technique is effective for use on images which contain a wide variety of cluttered background scenes.

Areas of moving objects are analyzed by using a contour-following algorithm to extract the region boundaries. For each region, the contour is smoothed, and the curvature of the contour is calculated. Feature points are identified along the contour at points of local extrema of the curvature.

The accumulated set of feature points for each region is compared to a model set of features corresponding to a head and shoulders shape. If a match is found, the head center coordinates are determined by calculating the mean value of the contour data for the portion of the contour that corresponds to the head. The size of the head is estimated as the mean distance from the head center to the contour. The temporal correlation of head center and size estimate is analyzed over several frames to identify spurious matches. Since only the outline of the head is analyzed, both front and back views, and usually also side views of heads are found.

This technique typically analyzes a frame in less than 30 milliseconds.

Combining the Channels—Training

Preferably, training procedures are used to provide the system controller with the necessary parameters for the n-gram search. The classifications are based on one or more head models chosen to represent expected situations. The models define all the size parameters required for the classifications and the order of the searches. To avoid a combinatorial explosion when exploring shape combinations, a greedy search is done, and a proper search order is thereby established. The order of the searches is based on a maximum entropy measure and is determined in the training procedure.

The model for frontal views are generated from a training set of 35 people looking into a camera. On this set the positions of the eyes and the eye pairs are measured. These measurements provide valuable information to the system controller when running the eye-pair search. Eye pairs can be found easily and reliably. The eye-pair search drastically reduces the number of shapes that have to be taken into account for further analysis. Thus, the preferred method of searching begins with the eye-pair search. Other features and feature combinations are classified in the same way, and an order of the searches is established by the training procedure.

It will be understood that the foregoing is merely illustrative of the principles of the invention, and that various modifications and variations can be made by those skilled in the art without departing from the scope and spirit of the invention. The claims appended hereto are intended to encompass all such modifications and variations.

We claim:

1. A method for locating objects in images, comprising:
    tracking designated objects in the images using a plurality of channels during a first number of frames, the objects comprised of one or more features, each of said channels producing an independent representation comprising perceived locations of said one or more features;
    determining a general score for each channel;
    selecting, based on said general scores, at least one channel for additional tracking;
    tracking the objects using said at least one channel during a second number of frames, each said at least one channel producing an independent representation comprising perceived locations of said one or more features; and
    combining said independent representations to produce a tracked output.

2. The method according to claim 1, wherein said determining step comprises:
searching for said features and combinations of said features within said independent representations produced during said first number of frames;
assigning measures of confidence to each said feature and each said combination of features; and
computing, based on said measures of confidence, said general score for each channel.

3. The method according to claim 2, wherein said searching step comprises an n-gram search.

4. The method according to claim 1, wherein the number of channels used for said tracking during said first number of frames is three, said three channels programmed to perform respective analyses of shape, color and motion to track the objects.

5. The method according to claim 2, wherein the number of channels used for said tracking during said first number of frames is three, said three channels programmed to perform respective analyses of shape, color and motion to track the objects.

6. The method according to claim 4, wherein the number of channels used for said tracking during said second number of frames is one.

7. The method according to claim 6, wherein said one channel used for said tracking during said second number of frames comprises the color channel.

8. The method according to claim 5, wherein the number of channels used for said additional tracking during said second number of frames is one.

9. The method according to claim 8, wherein said channel used for said tracking during said second number of frames comprises the color channel.

10. The method according to claim 2, wherein said combining step comprises an n-gram search.

11. The method according to claim 6, wherein said first number of frames is one.

12. The method according to claim 10, further comprising:
tracking the objects during a third number of frames using at least one channel used for said tracking during said second number of frames and at least one additional channel, each channel used for said tracking during said third number of frames producing an independent representation comprising perceived locations of said one or more features.

13. A method for locating objects in images, comprising:
tracking the objects during a first number of frames only using a channel programmed to perform a shape analysis and to produce calibrating data based on said analysis, said shape channel producing independent representations comprising perceived locations of the objects;
producing calibrating data by said shape channel after the passage of said first number of frames;
tracking the objects during a second number of frames using a channel programmed to perform a color analysis, said color channel calibrated using said calibrating data obtained by said shape channel, said color channel producing independent representations comprising perceived locations of the objects.

14. A method for locating objects in images, comprising:
tracking the objects during a first number of frames only using a channel programmed to perform a motion analysis and to produce calibrating data based on said analysis, said motion channel producing independent representations comprising perceived locations of the objects;
producing calibrating data by said motion channel after the passage of said first number of frames; and
tracking the objects during a second number of frames using a second channel programmed to perform a color analysis, said second channel calibrated using said calibrating data obtained by said motion channel, said color channel producing independent representations comprising perceived locations of the objects.

15. The method according to claim 13, further comprising integrating said independent representations into a tracked output.

16. The method according to claim 15, wherein said integration step comprises an n-gram search.

17. The method according to claim 14, further comprising integrating said independent representations into a tracked output.

18. The method according to claim 17, wherein said integration step comprises an n-gram search.

19. A method for locating heads and faces in images, comprising:
tracking the heads and faces during a first number of frames using a plurality of channels;
obtaining an independent intermediate feature representation from each of said plurality of channels after the passage of said first number of frames, said independent intermediate feature representations comprising data comprising perceived locations of head or facial features;
running a first n-gram search using said independent intermediate feature representations, wherein a measure of confidence is computed for each of said features and combinations of features within said independent intermediate feature representations, and wherein a general score is assigned to each channel based on said measures of confidence;
selecting one or more channels for additional tracking, said selection based on said general scores assigned to each channel;
tracking the heads and faces during a second number of frames using said one or more selected channels;
obtaining further independent feature representations from each of said one or more channels, each further independent feature representation comprising data comprising perceived locations of head or facial features; and
running a second n-gram search wherein said further independent feature representations are integrated into said independent intermediate feature representations to produce a tracked output.

20. The method of claim 19, wherein said plurality of channels used for tracking during said first number of frames comprise a shape channel, a motion channel, and a color channel.

21. The method of claim 19, wherein said plurality of channels used for tracking during said first number of frames comprise a shape channel, said tracking step using said shape channel further comprising:
passing the images through a band pass filter, said band pass filter having cutoff frequencies which permit the passage of facial features through said filter;
convolving the images with a structuring kernel using a second filter; and
thresholding the images using an adaptive thresholding technique, wherein said thresholding step transforms the head and facial features into connected components within the images.

22. A method for locating heads and faces within images, comprising:
- tracking the images for a first number of frames using a plurality of channels;
- obtaining, after the passage of said first number of frames, independent intermediate feature representations from each of said plurality of channels;
- evaluating said independent intermediate feature representations, said evaluation step used to determine a level of reliability for each of said plurality of channels;
- selecting, based on said determination of said reliability for each of said plurality of channels, one or more channels for additional tracking;
- tracking the images for a second number of frames using said selected one or more channels;
- obtaining further independent feature representations from said selected one or more channels after the passage of said second number of frames; and
- combining said independent intermediate feature representations and said further independent feature representations into a net representation of likely head and facial locations.

23. The method according to claim 22, wherein said evaluating step and said combining step comprise an n-gram search.

24. The method according to claim 22, wherein said plurality of channels used for tracking during said first number of frames comprises a shape channel, a motion channel, and a color channel.

25. A method for locating objects in images, comprising:
- tracking the objects during a first number of frames using only a first channel programmed to perform a shape analysis and a second channel programmed to perform a motion analysis, said first and second channels producing calibrating data based on said analyses, said first and second channels each producing independent representations comprising perceived locations of the object;
- producing calibrating data by said first and second channels after the passage of said first number of frames;
- tracking the objects during a second number of frames using a channel programmed to perform a color analysis, said color channel calibrated using said calibrating data obtained by said first and second channels, said color channel producing independent representations comprising perceived locations of the objects.

26. The method according to claim 25, further comprising integrating said independent representations into a tracked output.

27. The method according to claim 26, wherein said integration step comprises an n-gram search.

* * * * *